US006987339B2

(12) United States Patent

Adams et al.

(10) Patent No.: US 6,987,339 B2

(45) Date of Patent: Jan. 17, 2006

(54) FLYWHEEL SECONDARY BEARING WITH RHENIUM OR RHENIUM ALLOY COATING

(75) Inventors: Robbie Adams, Phoenix, AZ (US); Todd Giles, Phoenix, AZ (US); Sharon Brault, Chandler, AZ (US)

(73) Assignee: Honeywell International, Inc., Morristown, NJ (US)

( * ) Notice: Subject to any disclaimer, the term of this patent is extended or adjusted under 35 U.S.C. 154(b) by 68 days.

(21) Appl. No.: 10/447,341

(22) Filed: May 29, 2003

(65) Prior Publication Data

US 2003/0205944 A1 Nov. 6, 2003

Related U.S. Application Data

(63) Continuation-in-part of application No. 10/439,637, filed on May 15, 2003, and a continuation-in-part of application No. 10/243,445, filed on Sep. 13, 2002, now Pat. No. 6,821,313, and a continuation-in-part of application No. 10/138,090, filed on May 3, 2002, now Pat. No. 6,773,663, and a continuation-in-part of application No. 10/138,087, filed on May 3, 2002, now Pat. No. 6,749,803.

(60) Provisional application No. 60/384,737, filed on May 31, 2002, provisional application No. 60/384,631, filed on May 31, 2002, provisional application No. 60/384,587, filed on May 31, 2002.

(51) Int. Cl.
*H02K 7/09* (2006.01)

(52) U.S. Cl. .................................................... 310/90.5

(58) Field of Classification Search ............... 310/90.5, 310/90

See application file for complete search history.

(56) References Cited

U.S. PATENT DOCUMENTS

| | | | | |
|---|---|---|---|---|
| 2,467,675 | A | 4/1949 | Kurtz et al. | 75/22 |
| 3,378,392 | A | 4/1968 | Longo | 117/93.1 |
| 3,969,186 | A | 7/1976 | Thompson et al. | 176/68 |
| 4,067,742 | A | 1/1978 | Fletcher et al. | 106/43 |
| 4,119,458 | A | 10/1978 | Moore | 75/170 |
| 4,155,660 | A | 5/1979 | Takahashi et al. | 400/124 |
| 4,380,471 | A | 4/1983 | Lee et al. | 419/11 |
| 4,432,794 | A | 2/1984 | Holleck | 75/239 |
| 4,764,225 | A | 8/1988 | Shankar et al. | 148/404 |
| 4,915,733 | A | 4/1990 | Schütz et al. | 75/228 |
| 4,927,798 | A | 5/1990 | Baldi | 502/301 |
| 4,985,051 | A | 1/1991 | Ringwood | 51/309 |
| 5,021,697 | A * | 6/1991 | Kralick | 310/90.5 |

(Continued)

FOREIGN PATENT DOCUMENTS

| | | |
|---|---|---|
| EP | 1123908 | 8/2001 |

(Continued)

*Primary Examiner*—Darren Schuberg
*Assistant Examiner*—Nguyen Hanh
(74) *Attorney, Agent, or Firm*—Ingrassia Fisher & Lorenz

(57) ABSTRACT

A bearing for a high-speed and high-momentum rotating flywheel system for satellite or other applications that enables better recovery when unintended physical contact occurs. This better recovery is achieved through increased impact resistance and wear resistance by using a flat annulus connected to the main shaft of the primary bearing and secondary metal bearing and coating both annuli with rhenium or its alloys. Rhenium has a very high melting point but in the annealed condition is ductile so the rhenium coating is hardened to a very high strength and wear resistance but the rhenium beneath is still ductile. This combination of hard and soft material provides good wear resistance and impact resistance for those times when the primary bearing ceases to operate and contact is made with the secondary bearing.

34 Claims, 1 Drawing Sheet

U.S. PATENT DOCUMENTS

| | | | | | |
|---|---|---|---|---|---|
| 5,083,053 | A | * | 1/1992 | New | 310/90.5 |
| 5,138,832 | A | * | 8/1992 | Pande | 60/203.1 |
| 5,231,323 | A | * | 7/1993 | New | 310/90.5 |
| 5,262,202 | A | | 11/1993 | Garg et al. | 427/383.3 |
| 5,476,531 | A | | 12/1995 | Timm et al. | 75/240 |
| 5,577,263 | A | | 11/1996 | West | 428/552 |
| 5,588,754 | A | * | 12/1996 | Miller | 384/609 |
| 5,693,994 | A | * | 12/1997 | New | 310/90.5 |
| 5,704,538 | A | | 1/1998 | Mittendorf | 228/194 |
| 5,705,283 | A | * | 1/1998 | Upadhya | 428/610 |
| 5,722,034 | A | | 2/1998 | Kambara | 419/26 |
| 5,730,792 | A | | 3/1998 | Camilletti et al. | 106/287.14 |
| 5,745,834 | A | | 4/1998 | Bampton et al. | 419/37 |
| 5,824,425 | A | | 10/1998 | Mittendorf | 428/655 |
| 5,853,904 | A | | 12/1998 | Hall et al. | 428/670 |
| 5,928,799 | A | | 7/1999 | Sherman et al. | 428/655 |
| 5,993,980 | A | | 11/1999 | Schmitz et al. | 428/633 |
| 6,039,920 | A | | 3/2000 | Koch et al. | 420/590 |
| 6,127,047 | A | | 10/2000 | Worrell et al. | 428/615 |
| 6,203,752 | B1 | | 3/2001 | Bewlay et al. | 419/6 |
| 6,284,357 | B1 | | 9/2001 | Lackey et al. | 428/220 |

FOREIGN PATENT DOCUMENTS

| | | |
|---|---|---|
| SU | 1804141 | 5/1996 |

* cited by examiner

FLYWHEEL SECONDARY BEARING WITH RHENIUM OR RHENIUM ALLOY COATING

CROSS-REFERENCE TO RELATED APPLICATIONS

This patent application is related to and claims priority from the following provisional patent applications:

U.S. Provisional Patent Application Ser. No. 60/384,587 filed May 31, 2002 for IPACS Secondary Bearing with Rhenium or Rhenium Alloy Coating;

U.S. Provisional Patent Application Ser. No. 60/384,737 filed May 31, 2002 for Reduced Temperature and Pressure Powder Metallurgy Process for Consolidating Rhenium Alloys; and U.S. Provisional Patent Application Ser. No. 60/384,631 filed May 31, 2002 for Use of Powdered Metal Sintering/Diffusion Bonding to Enable Applying Silicon Carbide or Rhenium Alloys to Face Seal Rotors.

This patent application is related to and claims priority from the following regular utility applications:

this application is a continuation-in-part of U.S. patent application Ser. No. 10/138,090 filed May 3, 2002, now U.S. Pat. No. 6,773,663 for Oxidation and Wear Resistant Rhenium Metal Matrix Composite;

this application is a continuation-in-part of U.S. patent application Ser. No. 10/439,637 filed May 15, 2003 for Use of Powdered Metal Sintering/Diffusion Bonding to Enable Applying Silicon Carbide or Rhenium Alloys to Face Seal Rotors having a Honeywell docket number of H0002469;

this application is a continuation-in-part of U.S. patent application Ser. No. 10/138,087 filed May 3, 2002, now U.S. Pat. No. 6,749,803 for Oxidation Resistant Rhenium Alloys; and this application is a continuation-in-part of U.S. patent application Ser. No. 10/243,445 filed Sep. 13, 2002, now U.S. Pat. No. 6,821,313 for Reduced Temperature and Pressure Powder Metallurgy Process for Consolidating Rhenium Alloys.

The foregoing provisional and regular patent applications and the foregoing issued patents are incorporated herein by reference.

COPYRIGHT AUTHORIZATION

Portions of the disclosure of this patent document may contain material which is subject to copyright and/or mask work protection. The copy right and/or mask work owner has no objection to the facsimile reproduction by anyone of the patent document or the patent disclosure, as it appears in the Patent and Trademark Office patent file or records, but otherwise reserves all copyright and/or mask work rights whatsoever.

BACKGROUND OF THE INVENTION

1. Field of the Invention

This invention relates to bearings and more particularly to flywheel power systems for satellites and other applications, and, in particular, to a secondary bearing for a flywheel IPACS (Integrated Power and Attitude Control System) that enables better impact protection and recovery from power loss.

2. Description of the Related Art

IPACS is a system that performs attitude control and energy storage for commercial and military satellite applications that have one or more energy storage flywheels. For example, energy from a satellite's solar panel is stored in the IPACS flywheel system as kinetic energy during the sunlit portion of the orbit. The flywheel has an integral motor/generator that is accelerated to very high rotational speeds while such external energy is available from the satellite's solar panels. The kinetic energy stored in the flywheel enables the system to generate electrical energy when the power demand of the satellite is greater than the output of the solar array. In addition, the stored momentum of the system can be used to provide attitude control for the satellite.

Since a flywheel may rotate at tens of thousands of RPM's, the bearing system for the flywheel is crucial. The flywheel primary bearing may be a non-contact magnetic bearing. A secondary mechanical bearing (SMB) may be included in the system to provide backup, if electrical power is lost while the flywheel is rotating. The SMB prevents the magnetic bearing components, namely the rotor and stator, from contacting each other during such a power loss or overload and also enables rotation and power generation by the flywheel during such conditions. The surfaces of the primary bearing and the contacting surfaces of the SMB are in close proximity during normal operation of the magnetic bearing. This close proximity is to ensure that the primary bearing will move little, if at all, during a power failure to prevent primary bearing contact.

However, after a primary bearing failure, the rotor and mating face of the SMB may slide relative to each other for a short period of time during initial contact which can occur under high load and velocity. Under these conditions wear can occur. Since the clearance between magnetic bearing rotor and stator is very small, the reduction by wear of the contact face thickness of the SMB can result in magnetic bearing surface contact and damage if the SMB is engaged. In addition, impact damage of the SMB contact faces can result if the primary bearing suddenly loses power and drops to the SMB. If the magnetic bearing surfaces are damaged, the primary bearing may not be usable and the satellite may not be able to store energy or provide power at peak demand times. Also, the attitude control function could be reduced or eliminated, possibly dramatically affecting the usefulness and useful life of the satellite.

Conventional coatings for SMB use may be hard and fragile and can spall when subjected to impact. Such characteristics may be aggravated by the high temperatures which occur and tend to soften such coating materials as carburized or nitrided steel, tungsten carbide, and chromium carbide. Maintenance is difficult if not impossible in space, making reliable and robust SMBs highly desirable. Thus, there is a need for a flywheel system that has an SMB that is more robust and that addresses one or more of the drawbacks identified above.

SUMMARY OF THE INVENTION

The invention relates to a secondary mechanical bearing (SMB) with enhanced life and with optimized design and materials selection.

In one embodiment, and by way of example only, a magnetic primary bearing has a secondary bearing system. The secondary bearing system comprising has a first contact surface coated with a highly resilient material capable of resisting impact and wear at high temperatures and a second contact surface coated with a highly resilient material capable of resisting impact and wear at high temperatures.

In another embodiment, and by way of example only, the secondary bearing system has a first contact surface coated with a highly resilient material capable of resisting impact and wear at high temperatures, the first contact surface mounted for rotation with a primary bearing shaft and a stub, the first contact surface circumscribing a first support annulus. The second contact surface is coated with a highly resilient material capable of resisting impact and wear at high temperatures, the second contact surface mounted to a secondary bearing shaft defining a socket hollow, the second contact surface circumscribing a second support annulus. The first and second contact surfaces are able to rotate at high speed with respect to one another and withstanding contact with one another while resisting spalling. The stub fits within the socket hollow when the first contact surface contacts the second contact surface.

In another embodiment, and by way of example only, the secondary bearing system comprising has a first rhenium-reinforced bearing surface coupled to a primary bearing shaft and a second rhenium-reinforced bearing surface coupled to a mate to the primary bearing shaft with the second bearing surface generally oppositely opposed the first rhenium-reinforced bearing surface. Should the first and second bearing surfaces come into contact, the damage caused by contact between the primary bearing shaft and its mate is minimized by the impact and wear-resistant qualities of the first and second rhenium-reinforced bearing surfaces.

In another embodiment, and by way of example only, the secondary bearing system has a first refractory metal-reinforced bearing surface coupled to a primary bearing shaft and a second refractory metal-reinforced bearing surface coupled to a mate to the primary bearing shaft. The first and second surfaces are generally oppositely opposed one another. Should the two surfaces come into contact with one another, any damage caused by contact between the primary bearing shaft and its mate is minimized by impact and wear-resistant qualities of the first and second refractory metal-reinforced bearing surfaces.

The use of rhenium in the SMB indicates the use of not only rhenium and rhenium alloys, but other refractory materials and alloys thereof as well as those materials providing the same useful characteristics of refractory metals, including rhenium and its alloys.

Other features and advantages of the present invention will become apparent from the following description of the preferred embodiment(s), taken in conjunction with the accompanying drawings, which illustrate, by way of example, the principles of the invention.

DESCRIPTION OF THE PREFERRED EMBODIMENT(S)

Figure 1:
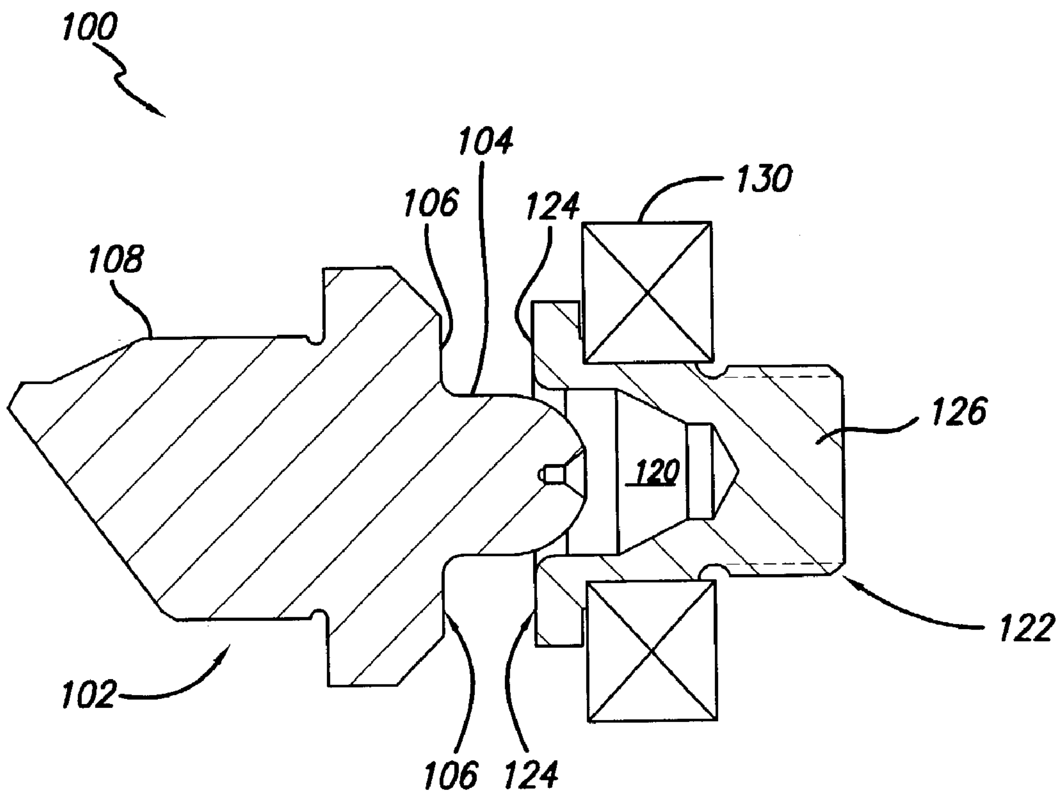
FIG. 1 is a side cross-sectional view of a bearing according to the present invention.

The detailed description set forth below in connection with the appended drawings is intended as a description of presently-preferred embodiments of the invention and does not represent the only forms in which the present invention may be constructed and/or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention, such as flywheel systems with magnetic bearing used in a variety of applications.

Integrated power and attitude flywheel control systems (IPACSs) perform attitude control and energy storage for satellites. In these systems, it is important to mount one or more flywheels for rotation with a minimum of friction losses. Thus, the IPACS uses a very low friction magnetic bearing as its primary bearing in order to facilitate low friction and very high rotational speeds (preferably 10,000 RPM and higher) as well as a secondary mechanical bearing (SMB) to allow flywheel rotation if the primary bearing fails temporarily or permanently. The IPACS secondary bearing is effective due to its geometry and its rhenium coating. As shown in FIG. 1, the SMB is a two-piece mating system 100. The upper portion 102 is an integral part of the primary bearing shaft 108. It has a short rounded stub 104 approximately one-half inch long surrounded by a flat annulus 106 approximately one-quaffer inch wide and with a one-inch outer diameter. The stub 104 fits into a hollow 120 within the mating portion 122 of the bearing 100 that is slightly larger than itself. This hollow 120 is also surrounded by an annulus 124 of generally the same dimensions as the upper half 102 of the bearing 100. Below the annulus 124 and hollow 120, the lower half 122 narrows to a shaft 126 on which resides a bearing 130 that allows rotation and supports the primary bearing. The clearance between the stub 104 and mating hollow 120 is small to keep the two halves aligned. The rounded end of the stub 104 allows easy entrance of the stub into the hollow 120.

The flat annular surfaces 106, 124 are coated with highly resilient materials such as with rhenium, a rhenium alloy, or other refractory material. An intermediate coating may be used to enhance adhesion and to account for coefficient of thermal expansion differences with respect to the substrate. The thickness of the rhenium and any intermediate coating(s) can be varied to fit specific design criteria but in general the intermediate layer would vary from one-thousandth to one-tenth inch (0.001" to 0.100") thickness and the rhenium layer could vary between one-thousandth to two-tenths inch (0.001" to 0.200"). Pure rhenium, rhenium alloys, rhenium metal matrix composites, and/or other refractory or sufficiently resilient materials could be employed. Alternatively, both annuli 106, 124 could be made entirely of such resilient materials.

Useful rhenium-based alloys and composites are disclosed and described in more detail in U.S. patent application Ser. No. 10/138,090 filed May 3, 2002 for Oxidation and Wear Resistant Rhenium Metal Matrix Composite; U.S. patent application Ser. No. 10/138,087 filed May 3, 2002 for Oxidation Resistant Rhenium Alloys; and recently-filed U.S. patent application Ser. No. 10/439,637 filed on May 15, 2003 entitled Use of Powdered Metal Sintering/Diffusion Bonding to Enable Applying Silicon Carbide or Rhenium Alloys to Face Seal Rotors, which applications are all incorporated herein by this reference thereto. The articles, devices, methods, and processes set forth in these co-pending applications may be used to good effect for the SMB.

In operation, the primary bearing shaft 108 spins rapidly upon energization by the satellite's solar cells. The magnetic bearing keeps the primary bearing shaft 108 from contacting any other bearing surface in order to provide a bearing with very low friction losses. Should the magnetic bearing system fail, or otherwise if there is physical contact between the annular contact surfaces 106, 124, the secondary mechanical bearing (SMB) 100 keeps the IPACS rotor spinning and able to operate.

When the annular contact surfaces 106, 124 come into contact, the stub 104 enters into the hollow socket 120 and the shaft 126 begins to turn within the roller element bearing 130. The SMB shaft 126 has inertia and does not immediately come up to the same angular speed as the primary bearing shaft 108. During this time, the annular contact surfaces 106, 124 slide against one another. As the surfaces are not frictionless, and as there may be some physical, perhaps even significant or violent impact between the two surfaces, it is necessary to reinforce their surfaces in order to withstand expected and possible emergency impacts and stresses.

When the secondary bearing shaft 126 reaches the same angular speed as the primary bearing shaft 108, the friction occurring between the annular contact surfaces 106, 124 ceases because they are no longer moving with respect to one another. Prior to this time, significant frictional heating may occur that may cause increased softening and/or spalling or wear in non-refractory or insufficiently resilient materials. The use of rhenium and/or rhenium based alloys serves to protect the annular contact surfaces 106, 124 of the SMB. By protecting the surfaces 106, 124, the SMB is better able to ensure the IPACS function under a variety of circumstances encountered by the satellite or other system incorporating the IPACS.

Increased impact resistance along with excellent wear resistance and resiliency at high temperature is achieved by using a flat annulus connected to the main shaft of the primary bearing and SMB and coating both annuli with rhenium (chemical element symbol Re) or its alloys. The flat annulus substrate may be low alloy steel to provide strength at a low cost. The larger area of the flat contact spreads the load and thus reduces stress. Rhenium coatings on the annuli provide wear and impact resistance. Since the coating volume is low, the actual cost of using expensive rhenium is low, although a fully refractory component may be used. Tests show that rhenium has a wear resistance comparable to tungsten carbide and carburized steel, but better than chromium carbide or nitrided surfaces. However, in the annealed condition rhenium is ductile. Thus, in wear service, a thin contact layer at the surface of the rhenium coating is hardened to very high strength and wear resistance but the rhenium beneath will still be ductile. This combination of hard and soft material gives good wear resistance but the rhenium beneath will still be ductile. This combination of hard and soft material also gives good wear resistance and impact resistance for those times when the primary bearing quickly ceases to operate and sudden contact is made with the secondary bearing.

The following is an application of the face seal technology of U.S. patent application Ser. No. 10/439,637 filed May 15, 2003 for Use of Powdered Metal Sintering/Diffusion Bonding to Enable Applying Silicon Carbide or Rhenium Alloys to Face Seal Rotors having a Honeywell docket number of H0002469 which is incorporated by reference to the SMB system set forth herein.

In one alternative embodiment of the SMB 100, one or more of the annuli 106, 124 may be coated with a mixture of refractory material (such as rhenium) in a thermally-conductive ceramic. Silicon carbide (SiC) grains are mixed with a powdered metallic (PM) binder to create a new composite that in a preferred embodiment is applied to a substrate, such as the annuli 106, 124. Rhenium and/or rhenium alloys are preferred matrix materials due to their high ductility, resulting in a tough, wear-resistant coating. The diffusion/bonding temperature of such rhenium-base materials is significantly below the temperature of conventional coating processes, therefore the sintering temperature is below the bearing part substrate (i.e., steel) melting point, and does not affect the embedded SiC when a sintering process is used to fuse the PM binder with the ceramic.

In a preferred substrate coating approach, the metal powder and SiC particles are mixed in specific quantities, placed on the surface of the annular substrate, and heated to the sintering temperature. A load is then applied with the appropriate bearing part held at temperature for a suitable time with the load. The temperature at which the material is under load can be varied, such as raising or lowering the temperature to promote or retard sintering. Sintering with rhenium and/or related alloys generally occurs below the melting point of rhenium, approximately, 3453° K. (5756° F., 3180° C.). The load can be applied by using a ram. Hot isostatic pressing (HIP) is considered to be a good candidate for applying the load. When subjecting the proto-bearing with the bearing surface to HIP, the part to be subject to HIP is surrounded with an appropriate foil and placed in an electron beam welding vacuum chamber. The foil is then sealed using electron beam welding. The assembly is then placed in a high-pressure furnace to apply both pressure and temperature to the assembly.

The load can generally be applied at any time during the process either before or during sintering or heating of the proto-bearing. The load may be applied and removed in increments. The load can generally be removed at any time after sintering once the sintering operation is complete. Currently, the preferred method is to apply a small preload of approximately 100 pounds during the heating of the proto-bearing to sintering temperature. The full load is then applied once the sintering temperature has been reached. It is currently believed that this gives the proto-bearing with its mixture an opportunity to drive off some of the oxides and moisture present on or in the metal and/or ceramic powders during the 100 pound load condition before applying the full load.

Once sintering has taken place, the assembly may then be cooled. Upon cooling, the now-coated bearing part may be removed and finished for use in an IPACS or other flywheel system.

A variation of this approach may include raising the temperature to a point where annealing, or softening, of the PM materials takes place. The annealing step may occur immediately after sintering and removal of load or it may be conducted as an entirely separate step. An intermediate coating between the Re/SiC alloy and the substrate may be employed to improve the interface properties between the bearing part substrate and the composite coating.

An alternative to the above coating approach is to bond a thin composite disc to a substrate. The rhenium alloy PM with SiC particles may be first created in the form of a thin disc within a non-reactive mold then, in a later step, it is brazed or bonded to a substrate of interest. Yet another alternative is to create a complete bearing part from the rhenium (Re) alloy/SiC mixture. The same PM/sinter steps as just noted would be followed except there is no substrate as the bearing part is made entirely of the PM-SiC material. Alternatively, the bearing part may be a pure rhenium or rhenium alloy disk.

The use of rhenium (Re) for powdered metal sintering/diffusion bonding is preferred, and may include, but is not limited to, rhenium (Re) or rhenium-based alloys. Other alloys, metals, or materials can also be used that preferably have high hot hardness, significant ductility, and high thermal conductivity. Cobalt, nickel, beryllium copper (BeCu), high strength bronzes and brasses, chrome, and chrome nickel alloys are all possible binder metals and/or coating substrates when using a powdered metal approach to encapsulate ceramic at the running surface of a flywheel bearing part. Also, the rhenium (Re) alloy can be used by itself as it has good thermal conductivity, ductility, and high hot hardness on its own. It is understood that the examples set forth herein are not intended to limit the materials subject to incorporation into the present system.

The ceramic encapsulated is not limited to silicon carbide, SiC. Any high thermal conductivity ceramic or equivalent material will enhance the life of an SMB. The ceramics that are of known interest in addition to reaction bonded and sintered SiC are silicon nitride (SiN), reaction bonded and sintered WC (tungsten carbide) and beryllium oxide (BeO). These are primary ones known in the industry experience and are noted here in particular. Noted also are single isotope ceramics, such as silicone 28 which appears to be commercially available in the near future with a 60% increase in thermal conductivity versus mixed isotopes.

Additionally, the following specific ceramic materials may not have been used previously in conjunction with a powdered metal for bearings but might be possible to use with the right system: alloys of silicon nitride and aluminum oxide, alumina, alumina titanate, aluminum nitride, beryllium oxide (BeO), boron nitride, braided ceramic fibers, bronze powder, carbide/cobalt hardmetal, carbonyl iron, carbonyl iron powder, carbonyl nickel, carbonyl nickel powder, cast carbide, ceramic eutectic composites, coarse-grained tungsten, cobalt, cobalt oxide, conventional carburized tungsten carbide (WC), copper, copper powder, diamond, entatite, fosterite, fusion bonds, hot-press matrices, infiltration matrices, macrocrystalline tungsten carbide powder, metal matrix composites, nickel oxide, niobium carbide powder, PCBN (polycrystalline cubic boron nitride), PCD (polycrystalline diamond), physical vapor deposition (PVD) coatings, reaction bonded silicon nitride, reaction bonded tungsten carbide (WC), reaction bonded tungsten carbide and sintered tungsten carbide (WC), SiAlON (silicon aluminum oxynitride), SiC whisker-reinforced alumina ceramic, silica zirconia, silicon nitride, sintered tungsten carbide (WC), steel, steel powder, superhard and other and other PCD and PCBN product extensions, superhard and other diamond and CBN (cubic boron nitride) coatings, superhard-coated and other material-coated silicon nitride, tantalum carbide powder, tantalum niobium carbide powder, tin, tin powder, titanium carbide (TiC), titanium carbide-titanium nitride- (TiC—TiN) based carbide and ceramic substrates, titanium carbide-titanium nitride TiC—TiN, titanium carbonitride powder, titanium diboride, titanium nitride powder, tungsten carbide macrocrystalline tungsten carbide (WC), tungsten metal powder, tungsten titanium carbide powder, zinc powder, zirconia, and mixtures thereof. Many potential candidates are known in the art as powdered metal ceramic composites that have been used previously for bearing parts, face seal parts, or the like. Such materials may have been used as a single piece instead of as just a local surface coating.

Encapsulating SiC (silicon carbide) in a sintered rhenium powdered metal alloy has several advantages including those already mentioned. The sintering temperature of the powdered metal (PM) is low enough not to vaporize the SiC. Such vaporization is a problem in plasma spray, high velocity oxygen fuel (HVOF), and detonation gun spray deposit systems. The particle size of the SiC can be selected to minimize the thermal and rotational stresses in the SiC. In fact, the alloy/particle size can be tailored to have different properties for each application. The powdered metal (PM) can create a tough, crack-resistant composite, even though it contains a brittle component. This may prevent brittle fractures due to handling mishaps. The powdered metal can be applied as a coating onto lower cost, high experience, bearing part metals. This can reduce costs and the risk that the material would fracture in service. The use of this or a similar coating allows mechanical bonding between the coating and the bearing part including (but not limited to) cutting a dovetail thread in the bearing part surface to ensure retention of the coating. Other mechanical bonding approaches include grit blasting the bearing part substrate, cutting a thread in the bearing part substrate, and cutting a sawtooth thread in the bearing part substrate, among others.

Alternatively, chemical bonding can be used to fix or attach the coating to the bearing part substrate. Such chemical bonding may include the use of bearing part plating to adhere the coating to the bearing part substrate. Nickel plating, chrome plating, cobalt plating and copper plating are a few examples of plating for chemical bonding purposes. Other means by which the coating may be attached to the bearing part substrate are within the contemplation of the current system.

Toughness and the ability to apply a coating require additional emphasis due to their unique advantages. The use of a coating reduces the volume of material that is ceramic or is metal matrix encapsulated ceramic (metal matrix composite). This reduces the cost of the bearing part. Solid or monolithic ceramic rings are expensive to machine and very sensitive to machining flaws. Ceramic particles (in the form of dust or otherwise) are added to the powdered metal so that machining of complete monolithic ceramic shapes is not required. The local coating can be applied to a high strength, high ductility (high toughness) steel. This reduces the risk of a fracture and subsequent structural failure that can arise from an entire bearing part of solid or monolithic ceramic or some metal matrix composite. Technical risk of component failure is reduced as the high centrifugal loads in aerospace applications are supported by the high toughness steel substrate. The steel substrate provides the toughness. The coating supplies the high thermal conductivity and hot hardness of the ceramic.

Additional enhancement of the seal bearing part's thermal conductivity is possible by selection of a high thermal conductivity steel alloy not typically used for seal bearing parts for use as the bearing part substrate. Nitriding grade steels such as 135M, Nitralloy 135M, Nitralloy EZ, and Nitralloy N135M have significantly higher (a 50% increase) in thermal conductivity than standard seal bearing part steel alloys due to the addition of aluminum to the alloy to improve nitriding properties. Other thermally conductive and resilient materials may also be used for bearing part substrate manufacture.

High thermal conductivity substrate steels such as Nitralloy G, 135M, SAE 7140, AMS 6470, N or AMS 6475, and EZ are a subset of known industry steels with increased amounts of aluminum. Industry uses the increased aluminum content in such steels to improve the response of the steel to nitriding. The increased aluminum content also results in increased thermal conductivity of the steel which is a significant benefit for SMB bearing parts.

While the present invention has been described with reference to a preferred embodiment or to particular embodiments, it will be understood that various changes and additional variations may be made and equivalents may be substituted for elements thereof without departing from the scope of the invention or the inventive concept thereof. In addition, many modifications may be made to adapt a particular situation or material to the teachings of the invention without departing from the essential scope thereof.

Therefore, it is intended that the invention not be limited to particular embodiments disclosed herein for carrying it out, but that the invention includes all embodiments falling within the scope of the appended claims.

What is claimed is:

1. A secondary bearing system, the secondary bearing system comprising:

a primary bearing shaft having a first contact surface coated with a first material comprising rhenium; and a secondary bearing shaft having a second contact surface coated with a second material comprising rhenium, the second contact surface being initially separated from the first contact surface.

2. The secondary bearing system as set forth in claim 1, wherein the first and second contact surfaces are adapted to rotate at high speed with respect to one another while withstanding contact with one another.

3. The secondary bearing system as set forth in claim 1, wherein the secondary bearing shaft comprises a socket hollow that is adjacent to the second contact surface; and the primary bearing shaft comprises a stub that is adjacent to the first contact surface and adapted to fit within the socket hollow when the first contact surface contacts the second contact surface.

4. The secondary bearing system as set forth in claim 1, wherein the primary bearing shaft comprises a first support annulus that includes the first contact surface; and the secondary bearing shaft comprises a second support annulus that includes the second contact surface.

5. The secondary bearing system as set forth in claim 1, wherein the first and second contact surfaces are adapted to engage each other, whereby the secondary mechanical bearing engages and supports the primary bearing shaft.

6. The secondary bearing system as set forth in claim 1, wherein the primary and secondary bearing shafts are components of an integrated power and attitude control system.

7. The secondary bearing system as set forth in claim 1, wherein each of the first and second materials is a mixture of a powdered ceramic and powdered metal comprising rhenium.

8. The secondary bearing system as set forth in claim 7, wherein each of the primary and secondary bearing shafts comprises steel.

9. The secondary bearing system as set forth in claim 8, wherein each of the primary and secondary bearing shafts comprises an aluminum alloy of steel.

10. The secondary bearing system as set forth in claim 9, wherein each of the primary and secondary bearing shafts comprises aluminum alloys of steel selected from the group consisting of 135M, Nitralloy 135M, Nitralloy EZ, Nitralloy Gi, Nitralloy N, SAE 7140, AMS 6470, AMS 6475, Nitralloy N135M, thermally conductive steels, and steels having at least 0.011% by weight of aluminum.

11. The secondary bearing system as set forth in claim 7, wherein the powdered ceramic further comprises silicon carbide (SiC).

12. The secondary bearing system as set forth in claim 7, wherein the powdered ceramic further comprises powdered ceramic selected from the group consisting of alumina, alumina titanate, aluminum nitride, and mixtures thereof, beryllium oxide, boron nitride, braided ceramic fibers, carbide/cobalt hardmetal, cast carbide, ceramic eutectic composites, coarse-grained tungsten, coated silicon nitride, cobalt oxide, conventional carburized tungsten carbide, diamond, entatite, fosterite, hot-press matrices, infiltration matrices, macrocrystalline tungsten carbide powder, macrocrystalline tungsten carbide sintered tungsten, metal matrix composites, multi-layered PVD coatings, nickel oxide, niobium carbide powder, physical vapor deposition coatings, reaction bonded silicon nitride, reaction bonded tungsten carbide, reaction bonded tungsten carbide and sintered tungsten carbide, silica zirconia, silicon carbide whiskers, silicon carbide fibers, silicon carbide whisker-reinforced alumina ceramic, silicon nitride, sintered tungsten carbide, tantalum carbide powder tantalum niobium carbide powder, titanium carbide, titanium carbide-titanium nitride, titanium carbide-titanium nitride-based carbide and ceramic substrates, titanium carbide-titanium nitride-based carbide substrates, titanium carbide-titanium nitride-based ceramic substrates, titanium carbonitride powder, titanium diboride, titanium nitride powder, tungsten carbide macrocrystalline tungsten carbide, tungsten disulfide, tungsten metal powder, tungsten sulfide, tungsten titanium carbide powder, zirconia, and mixtures thereof.

13. The secondary bearing system as set forth in claim 7, wherein the powdered metal is powdered rhenium.

14. The secondary bearing system as set forth in claim 7, wherein the powdered metal is a powdered rhenium-based alloy.

15. The secondary bearing system as set forth in claim 7, wherein the mixture of powdered ceramic and powdered metal have been fused to the primary and secondary bearing shafts by sintering.

16. The secondary bearing system as set forth in claim 1, wherein each of the first and second materials is rhenium.

17. The secondary bearing system as set forth in claim 1, wherein each of the first and second materials is a rhenium alloy.

18. A secondary bearing system, comprising:

a primary bearing shaft having a stub and an adjacent first support annulus that comprises a first contact surface coated with a first material comprising rhenium;

a secondary bearing shaft having a socket hollow and an adjacent second support annulus that comprises a second contact surface coated with a second material comprising rhenium;

the first and second contact surfaces being adapted to rotate at high speed with respect to one another and withstanding contact with one another while resisting spalling; and the stub fitting within the socket hollow when the first contact surface contacts the second contact surface.

19. The secondary bearing system as set forth in claim 18, wherein the first and second contact surfaces are adapted to engage each other, whereby the secondary mechanical bearing engages and supports the primary bearing shaft.

20. The secondary bearing system as set forth in claim 19, wherein the primary and secondary bearing shafts are components of an integrated power and attitude control system.

21. The secondary bearing system as set forth in claim 18, wherein each of the first and second materials is rhenium.

22. The secondary bearing system as set forth in claim 18, wherein each of the first and second materials is a rhenium alloy.

23. A secondary bearing system, the secondary bearing system comprising:

a primary bearing shaft having a first surface that is reinforced with a rhenium-containing material; and a secondary component having a second surface that is reinforced with a rhenium-containing material, the second surface being adapted to mate the primary bearing shaft and a generally oppositely opposed the first surface.

24. The secondary bearing system as set forth in claim 23, wherein each of the first and second surfaces is reinforced by a mixture of powdered ceramic and powdered refractory metal that have been fused to a respective substrate.

25. The secondary bearing system as set forth in claim 24, wherein the powdered ceramic further comprises silicon carbide (SiC).

26. The secondary bearing system as set forth in claim 24, wherein the powdered ceramic further comprises powdered ceramic selected from the group consisting of alumina, alumina titanate, aluminum nitride, and mixtures thereof, beryllium oxide, boron nitride, braided ceramic fibers, carbide/cobalt hardmetal, cast carbide, ceramic eutectic composites, coarse-grained tungsten, coated silicon nitride, cobalt oxide, conventional carburized tungsten carbide, diamond, entatite, fosterite, hot-press matrices, infiltration matrices, macrocrystalline tungsten carbide powder, macrocrystalline tungsten carbide sintered tungsten, metal matrix composites, multi-layered PVD coatings, nickel oxide, niobium carbide powder, physical vapor deposition coatings, reaction bonded silicon nitride, reaction bonded tungsten carbide, reaction bonded tungsten carbide and sintered tungsten carbide, silica zirconia, silicon carbide whiskers, silicon carbide fibers, silicon carbide whisker-reinforced alumina ceramic, silicon nitride, sintered tungsten carbide, tantalum carbide powder, tantalum niobium carbide powder, titanium carbide, titanium carbide-titanium nitride, titanium carbide-titanium nitride-based carbide and ceramic substrates, titanium carbide-titanium nitride-based carbide substrates, titanium carbide-titanium nitride-based ceramic substrates, titanium carbonitride powder, titanium diboride, titanium nitride powder, tungsten carbide macrocrystalline tungsten carbide, tungsten disulfide, tungsten metal powder, tungsten sulfide, tungsten titanium carbide powder, zirconia, and mixtures thereof.

27. The secondary bearing system as set forth in claim 24, wherein the powdered metal is powdered rhenium.

28. The secondary bearing system as set forth in claim 24, wherein the powdered metal is a powdered rhenium-based alloy.

29. The secondary bearing system as set forth in claim 24, wherein the mixture of powdered ceramic and powdered metal have been fused to the primary and secondary bearing shafts by sintering.

30. The secondary bearing system as set forth in claim 24, wherein each of the primary and secondary bearing shafts comprises steel.

31. The secondary bearing system as set forth in claim 30, wherein each of the primary and secondary bearing shafts comprises an aluminum alloy of steel.

32. The secondary bearing system as set forth in claim 31, wherein each of the primary and secondary bearing shafts comprises aluminum alloys of steel selected from the group consisting of 135M, Nitralloy 135M, Nitralloy EZ, Nitralloy G, Nitralloy N, SAE 7140, AMS 6470, AMS 6475, Nitralloy N135M, thermally conductive steels, and steels having at least 0.011% by weight of aluminum.

33. The secondary bearing system as set forth in claim 23, wherein each of the first and second surfaces is reinforced by rhenium.

34. The secondary bearing system as set forth in claim 23, wherein each of the first and second surfaces is reinforced by a rhenium alloy.

* * * * *